US012474622B2

United States Patent
Minamisawa

(10) Patent No.: US 12,474,622 B2
(45) Date of Patent: Nov. 18, 2025

(54) OPTICAL UNIT

(71) Applicant: NIDEC INSTRUMENTS CORPORATION, Nagano (JP)

(72) Inventor: Shinji Minamisawa, Nagano (JP)

(73) Assignee: NIDEC INSTRUMENTS CORPORATION, Nagano (JP)

(*) Notice: Subject to any disclaimer, the term of this patent is extended or adjusted under 35 U.S.C. 154(b) by 145 days.

(21) Appl. No.: 18/430,658

(22) Filed: Feb. 2, 2024

(65) Prior Publication Data

US 2024/0272520 A1    Aug. 15, 2024

(30) Foreign Application Priority Data

Feb. 13, 2023   (JP) .................. 2023-019770

(51) Int. Cl.
*G03B 5/08* (2021.01)
*G03B 5/04* (2021.01)

(52) U.S. Cl.
CPC .............. *G03B 5/08* (2013.01); *G03B 5/04* (2013.01); *G03B 2205/0069* (2013.01)

(58) Field of Classification Search
CPC ...... H04N 23/687; H04N 23/55; G03B 17/02; G03B 5/08; G03B 5/04; G03B 5/00; G03B 5/06; G03B 2205/0069; G03B 2217/002; G03B 30/00
See application file for complete search history.

(56) References Cited

U.S. PATENT DOCUMENTS

| | | | |
|---|---|---|---|
| 2021/0215900 A1* | 7/2021 | Sue ................. | G03B 17/55 |
| 2021/0223663 A1* | 7/2021 | Minamisawa ......... | G03B 30/00 |
| 2021/0231967 A1* | 7/2021 | Yanagisawa ......... | G02B 27/646 |
| 2021/0278691 A1* | 9/2021 | Hatano ............ | G03B 30/00 |

FOREIGN PATENT DOCUMENTS

WO   2019221038   11/2019

* cited by examiner

*Primary Examiner* — Twyler L Haskins
*Assistant Examiner* — John H Morehead, III
(74) *Attorney, Agent, or Firm* — JCIPRNET

(57) ABSTRACT

An optical unit includes a movable body, a fixed body, and a gimbal mechanism. The gimbal mechanism includes a flat plate portion on an opposite subject side with respect to the movable body, two fixed body-side arm portions extending from base end portions to tip end portions in a first intersecting direction, and two movable body-side arm portions extending from base end portions to tip end portions in a second intersecting direction, the fixed body-side arm portions and the movable body-side arm portions are inclined with respect to the flat plate portion as viewed from the intersecting directions, and an inclination direction of the fixed body-side arm portions and an inclination direction of the movable body-side arm portions are opposite to each other as viewed from the intersecting directions.

15 Claims, 12 Drawing Sheets

OPTICAL UNIT

CROSS REFERENCE TO RELATED APPLICATION

The present invention claims priority under 35 U.S.C. § 119 to Japanese Application No. 2023-019770 filed Feb. 13, 2023, the entire content of which is incorporated herein by reference.

BACKGROUND

Field of the Invention

At least an embodiment of the present invention relates to an optical unit.

Description of the Related Documents

Various optical units have conventionally been used. Such optical units include an optical unit in which a movable body including an optical module is swingably supported with respect to a fixed body. For example, WO2019/221038 discloses an optical unit that includes a gimbal mechanism and in which a movable body including an optical module is swingably supported with respect to a fixed body.

In a conventional optical unit in which a movable body including an optical module is swingably supported with respect to a fixed body, a gimbal mechanism is generally provided on a subject side. In an optical unit in which a gimbal mechanism is provided on a subject side, an optical module is provided on the subject side, and thus the gimbal mechanism needs to be placed in such a manner that the gimbal mechanism is not in contact with the optical module. In such an optical unit, in order to prevent the optical unit from having a small swing range of a movable body with respect to a fixed body, the optical unit needs to have a large thickness in an optical axis direction to avoid a collision, with the movable body and the fixed body, of a gimbal mechanism that does not have a sturdy structure. Thus, an object of at least an embodiment of the present invention is to enable an optical unit in which a movable body including an optical module is swingably supported with respect to a fixed body to have a small thickness in an optical axis direction, without causing the optical unit to have a small swing range.

SUMMARY

An optical unit of at least an embodiment of the present invention includes: a movable body including an optical module; a fixed body; and a gimbal mechanism that rotatably supports the movable body with respect to the fixed body around a rotation axis that extends in at least one of intersecting directions intersecting an optical axis direction along an optical axis of the optical module, wherein the gimbal mechanism includes a flat plate portion that is provided on an opposite subject side opposite to a subject side of the optical module with respect to the movable body in the optical axis direction, two fixed body-side arm portions that extend from base end portions connected to the flat plate portion to tip end portions connected to the fixed body in a first intersecting direction of the intersecting directions, and two movable body-side arm portions that extend from base end portions connected to the flat plate portion to tip end portions connected to the movable body in a second intersecting direction of the intersecting directions, the fixed body-side arm portions and the movable body-side arm portions are inclined with respect to the flat plate portion as viewed from the intersecting directions, and an inclination direction of the fixed body-side arm portions and an inclination direction of the movable body-side arm portions are opposite to each other as viewed from the intersecting directions.

At least an embodiment of the present invention enables an optical unit in which a movable body including an optical module is swingably supported with respect to a fixed body to have a small thickness in an optical axis direction, without causing the optical unit to have a small swing range.

BRIEF DESCRIPTION OF THE DRAWINGS

Embodiments will now be described, by way of example only, with reference to the accompanying drawings which are meant to be exemplary, not limiting, and wherein like elements are numbered alike in several figures, in which.

DETAILED DESCRIPTION

Figure 1:
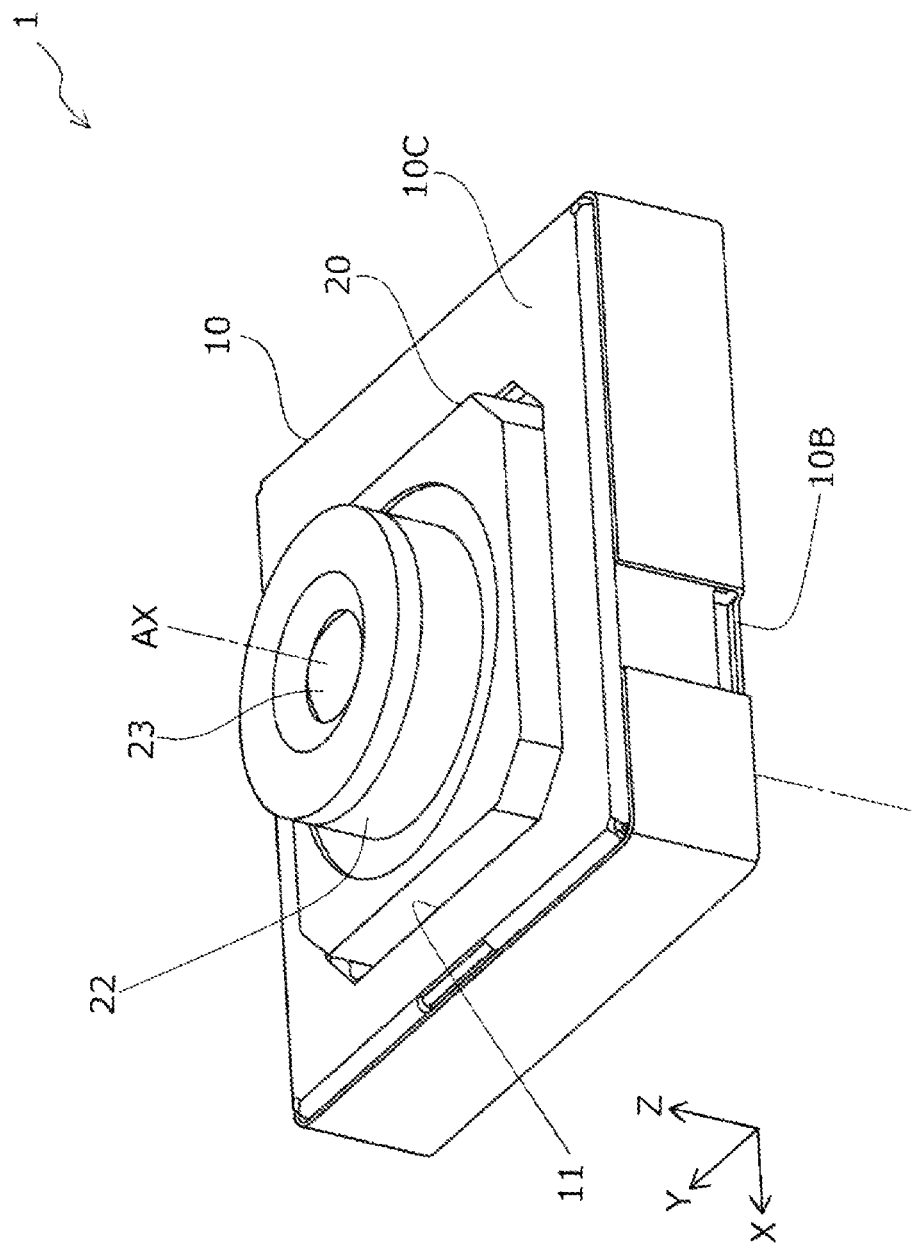
FIG. 1 is a perspective view of an optical unit according to at least an embodiment of the present invention.
Figure 2:
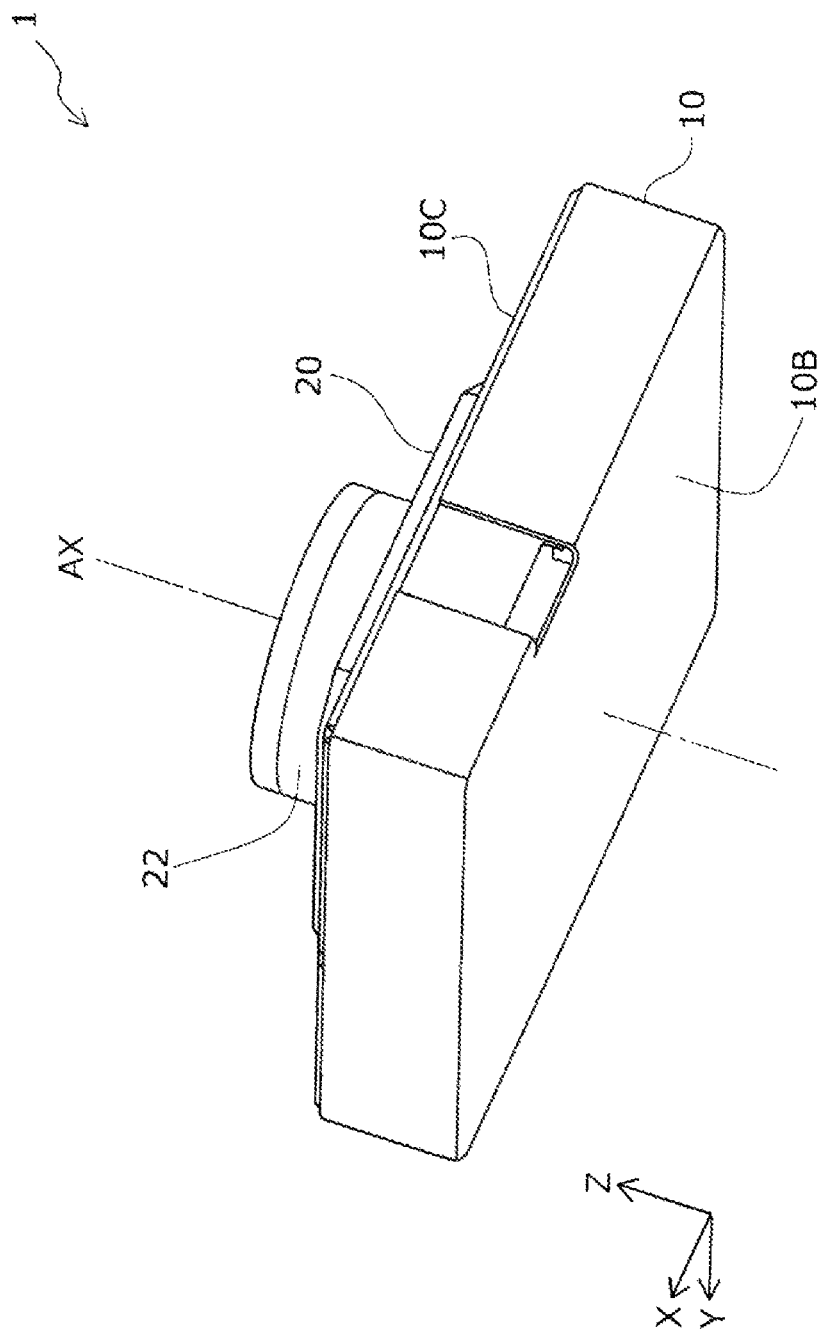
FIG. 2 is a perspective view of the optical unit in FIG. 1, as viewed from an angle different from that in FIG. 1.

An optical unit 1 according to at least an embodiment of the present invention will be described below with reference to FIGS. 1 to 12. In the drawings, a Z-axis direction is an optical axis direction, an X-axis direction is a direction intersecting an optical axis AX, in other words, a yaw axis direction, and a Y-axis direction is a direction intersecting the optical axis AX, in other words, a pitch axis direction. Of the Z-axis direction, +Z direction, which is a direction pointed by the arrow, is a direction toward a subject side, and −Z direction, which is a direction opposite to the direction pointed by the arrow, is a direction toward an opposite subject side opposite to the subject side.

Figure 4:
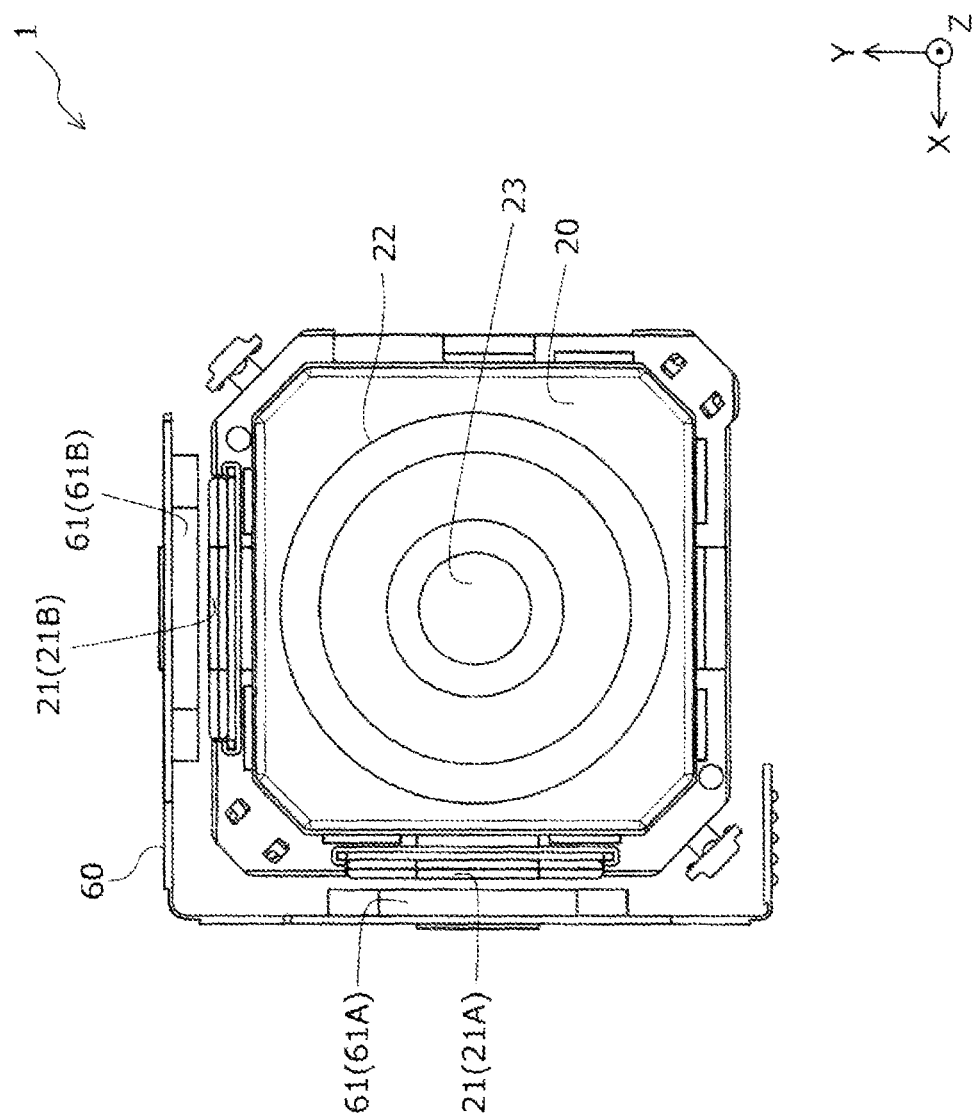
FIG. 4 is a plan view of the optical unit in FIG. 1, and illustrates a positional relationship between magnets and coils by omitting a fixed body.

The optical unit 1 of the present embodiment includes a movable body 20 that includes an optical module 22, and a fixed body 10 that surrounds the movable body 20 in a circumferential direction intersecting the optical axis direction (Z-axis direction) of the optical module 22. Furthermore, the optical unit 1 of the present embodiment includes a gimbal mechanism 30 as a swing support mechanism that swingably supports the movable body 20 with respect to the fixed body 10 around a swing axis that extends in an intersecting direction (a plane direction including the X-axis direction and the Y-axis direction) intersecting the optical axis direction. Furthermore, as shown in FIG. 4, the optical unit 1 of the present embodiment includes a rotation drive mechanism that includes coils 61 that are provided in the fixed body 10, and magnets 21 (magnets 21A and 21B) that are provided at positions in the movable body 20 that face the coils 61 (coils 61A and 61B). The coils 61 are provided inside a flexible flat cable (FFC) 60 that is attached to the fixed body 10.

Overall Configuration of Optical Unit

First, an overall configuration of the optical unit 1 of the present embodiment will be described. The optical unit 1 of the present embodiment can be suitably used in a camera, a smart phone, or the like. This is because the optical unit 1 of the present embodiment can have a compact configuration, allowing a camera or a smart phone to have a compact configuration. However, the use of the optical unit 1 of the present embodiment is not limited to a camera or a smart phone, and the optical unit 1 of the present embodiment can be used in various devices without particular limitation on use.

Figure 3:
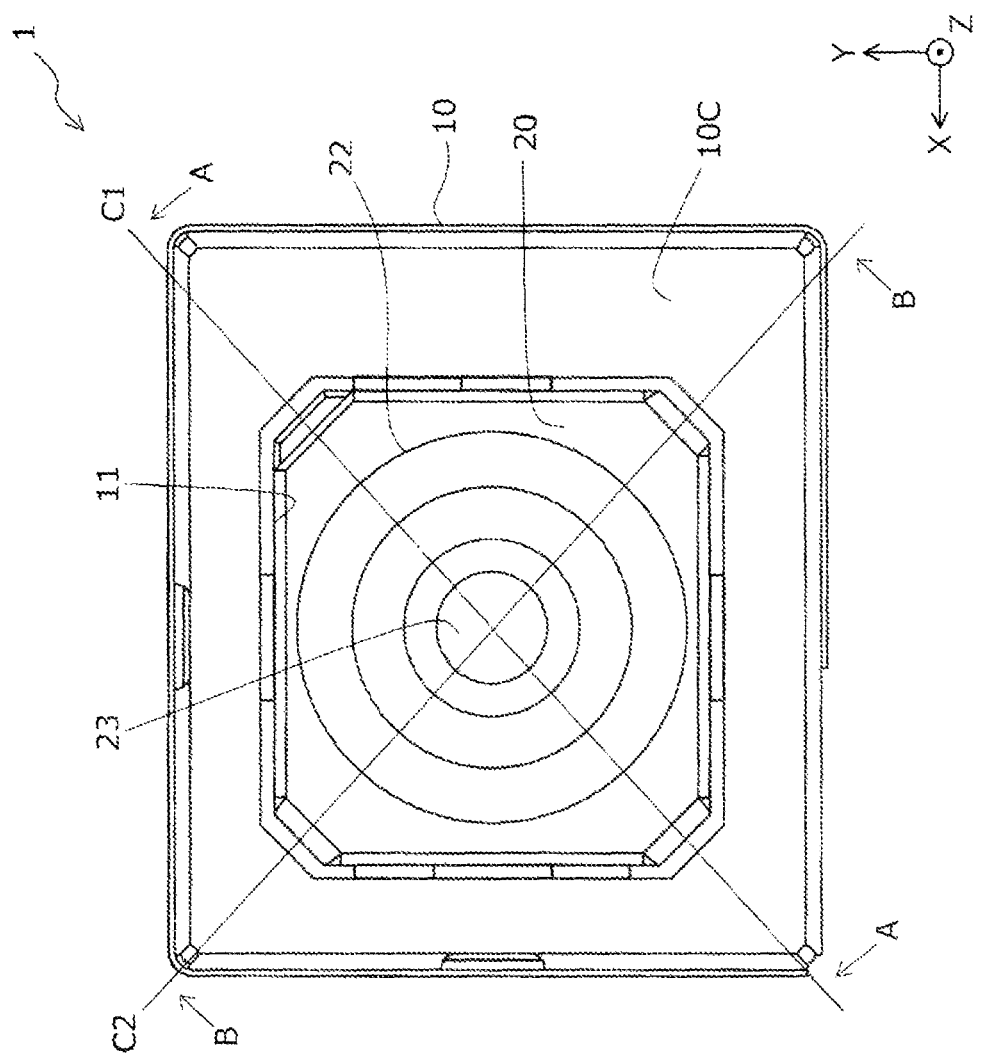
FIG. 3 is a plan view of the optical unit in FIG. 1.

As shown in FIGS. 1, 3, and 4, the optical unit 1 of the present embodiment includes the movable body 20 including the optical module 22 that includes a lens 23 and the like. Furthermore, the optical unit 1 of the present embodiment includes the fixed body 10 including a case portion 10A that surrounds the movable body 20 in an intersecting direction (circumferential direction) intersecting the optical axis direction (Z-axis direction) of the optical module 22, a bottom surface component 10B that is capable of covering the case portion 10A from the −Z direction side while the movable body 20 is housed in the case portion 10A, and a cover portion 10C that is capable of covering the case portion 10A from the +Z direction side while the movable body 20 is housed in the case portion 10A and the optical module 22 is partially exposed.

Furthermore, the optical unit 1 of the present embodiment includes the gimbal mechanism 30 that is provided between the movable body 20 and the fixed body 10 and includes fixed body-side arm portions 30A that are connected to the fixed body 10, movable body-side arm portions 30B that are connected to the movable body 20, and a flat plate portion 30C that is provided with the fixed body-side arm portions 30A and the movable body-side arm portions 30B. The gimbal mechanism 30 has a spring property, and swingably supports the movable body 20 with respect to the fixed body 10 around a swing axis that extends in the X-axis direction and the Y-axis direction. The gimbal mechanism 30 that is a main portion of the optical unit 1 of the present embodiment will be described in detail below.

Movable Body

The optical module 22 is a part of the movable body 20, and is provided in such a manner that a portion of the optical module 22 in which the lens 23 is located protrudes from a surface of the movable body 20 in the +Z direction. The magnet 21A constituting the rotation drive mechanism as a drive unit that enables the movable body 20 to be moved with respect to the fixed body 10 is provided on a side surface of the movable body 20 in the +X direction. Furthermore, the magnet 21B constituting the rotation drive mechanism is provided on a side surface of the movable body 20 in the +Y direction. The magnets 21A and 21B both have the same configuration. As with the optical module 22, the magnets 21A and 21B also constitute a part of the movable body 20.

Fixed Body

In the fixed body 10, the bottom surface component 10B and the cover portion 10C surround the movable body 20 in the Z-axis direction, and the case portion 10A surrounds the movable body 20 in a direction intersecting the Z-axis direction. The cover portion 10C of the fixed body 10 on the +Z direction side has a hole portion 11 through which the portion of the optical module 22 in which the lens 23 is located passes.

The coils 61 constituting the rotation drive mechanism are provided on a side surface of the fixed body 10 on the +X direction side and on a side surface of the fixed body 10 on the +Y direction side. The coils 61 are provided at positions facing the magnets 21A and 21B. The coil 61A at the position facing the magnet 21A and the coil 61B at the position facing the magnet 21B have the same configuration. The coils 61A and 61B also constitute a part of the fixed body 10.

Gimbal Mechanism

Figure 8:
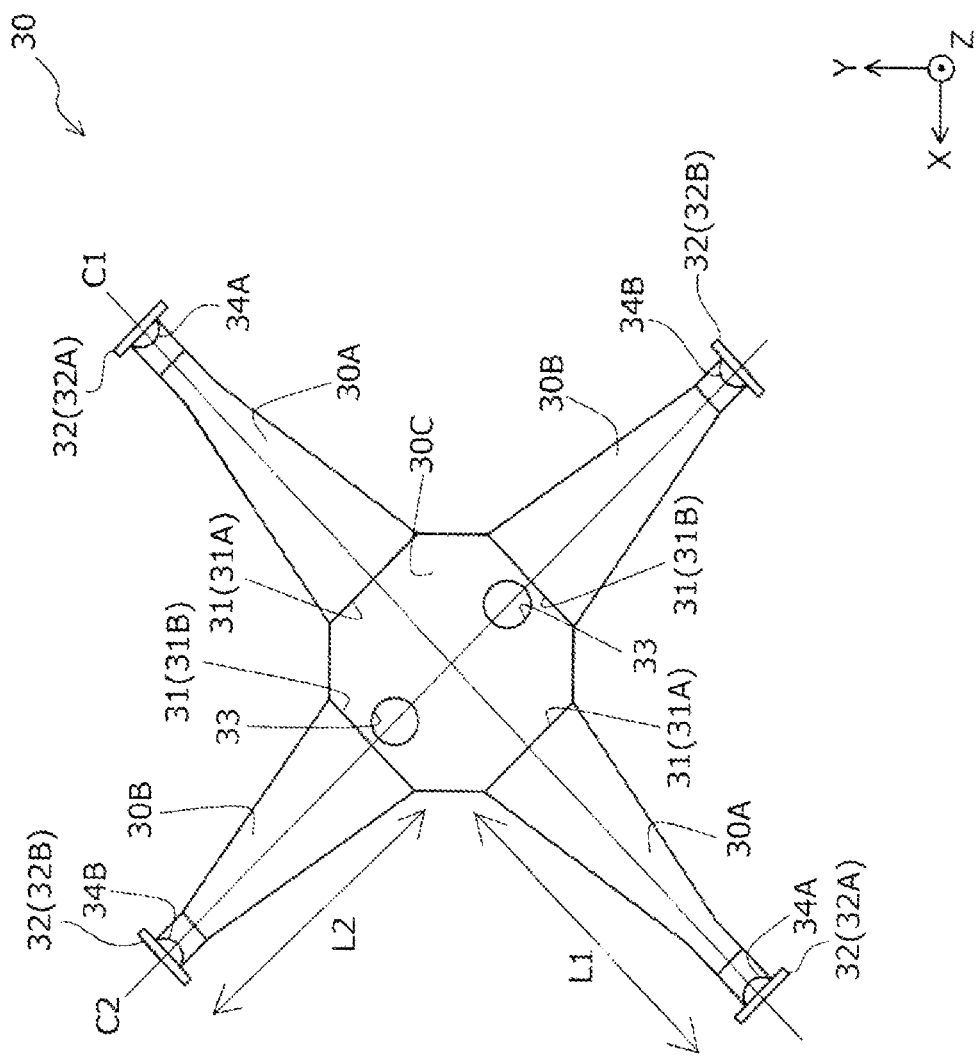
FIG. 8 is a plan view of the gimbal mechanism of the optical unit in FIG. 1.

As shown in FIG. 8, the gimbal mechanism 30 includes the flat plate portion 30C having a substantially octagonal outer shape, the fixed body-side arm portions 30A that are connecting portions connected to the fixed body 10, and the movable body-side arm portions 30B that are connecting portions connected to the movable body 20. The fixed body-side arm portions 30A and the movable body-side arm portions 30B are provided on diagonal lines of the flat plate portion 30C as viewed from the optical axis direction. The fixed body-side arm portions 30A that are two connecting portions on one of the diagonal lines are swingably connected to the fixed body 10, and the movable body-side arm portions 30B that are two connecting portions on the other diagonal line are swingably connected to the movable body 20. The optical unit 1 of the present embodiment is configured such that the gimbal mechanism 30 allows the movable body 20 to be swingable with respect to the fixed body 10 in the yaw axis direction and the pitch axis direction. Furthermore, the optical unit 1 of the present embodiment may be configured such that a mechanism different from the gimbal mechanism 30 is provided and allows the movable body 20 to be swingable with respect to the fixed body 10 in a rolling direction.

Figure 5:
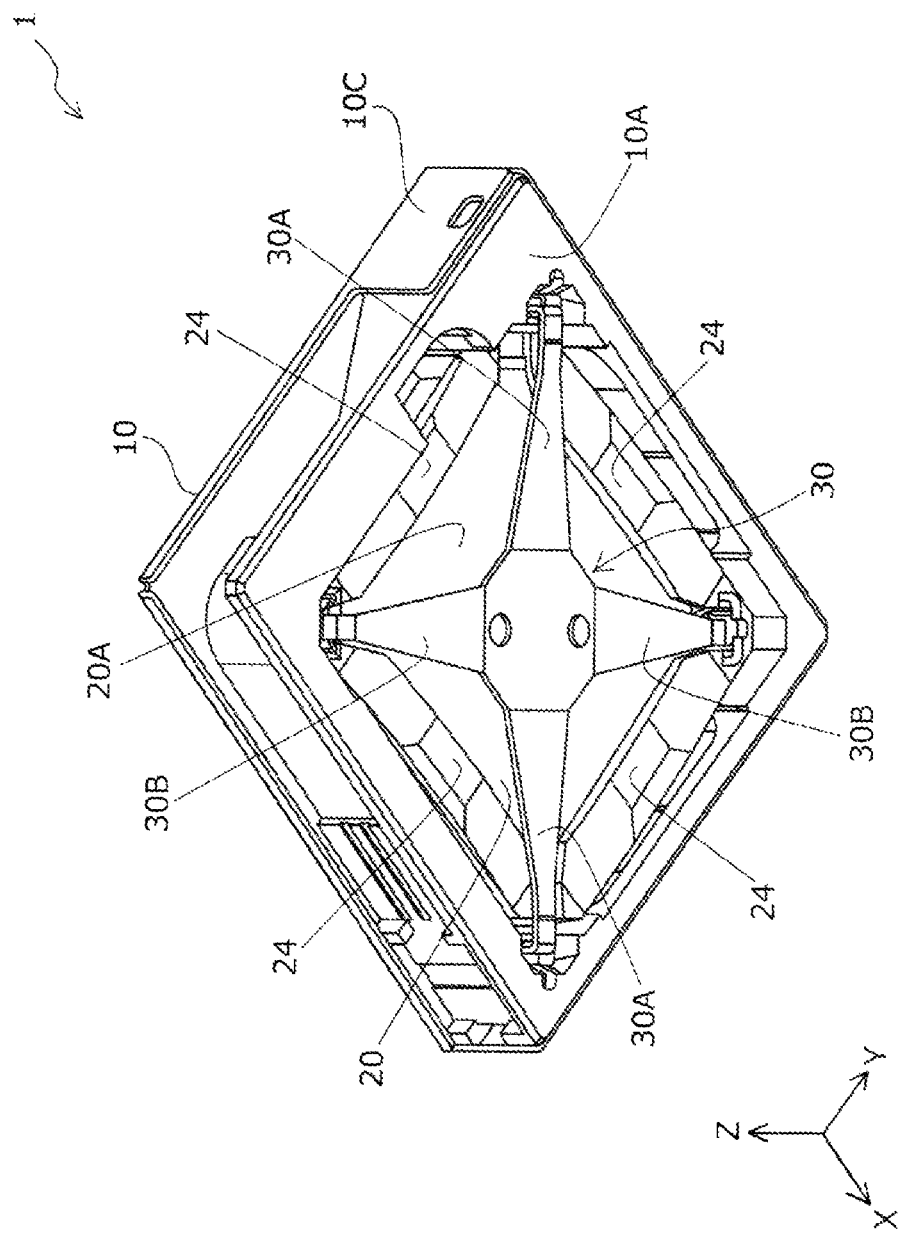
FIG. 5 is a perspective view of the optical unit in FIG. 1, and illustrates placement of a gimbal mechanism by omitting a bottom surface component of the fixed body.

As described above, the optical unit 1 of the present embodiment includes the movable body 20 including the optical module 22, the fixed body 10, and the gimbal mechanism 30 that rotatably supports the movable body 20 with respect to the fixed body 10 around a rotation axis that extends in at least one of the intersecting directions intersecting the optical axis direction along the optical axis AX of the optical module 22. As shown in FIG. 5 and the like, the gimbal mechanism 30 of the present embodiment includes the flat plate portion 30C that is provided on the opposite subject side (−Z direction side) opposite to the subject side of the optical module 22 with respect to the movable body 20 in the optical axis direction. As shown in FIGS. 5, 8, and the like, the gimbal mechanism 30 of the present embodiment includes the two fixed body-side arm portions 30A that extend from base end portions 31 (base end portions 31A) connected to the flat plate portion 30C to tip end portions 32 (tip end portions 32A) connected to the fixed body 10 in a first intersecting direction C1 of the intersecting directions as viewed from the optical axis direction. Furthermore, as shown in FIGS. 5, 8, and the like, the gimbal mechanism 30 of the present embodiment includes the two movable body-side arm portions 30B that extend from base end portions 31 (base end portions 31B) connected to the flat plate portion 30C to tip end portions 32 (tip end portions 32B) connected to the movable body 20 in a second intersecting direction C2 of the intersecting directions as viewed from the optical axis direction.

Figure 9:
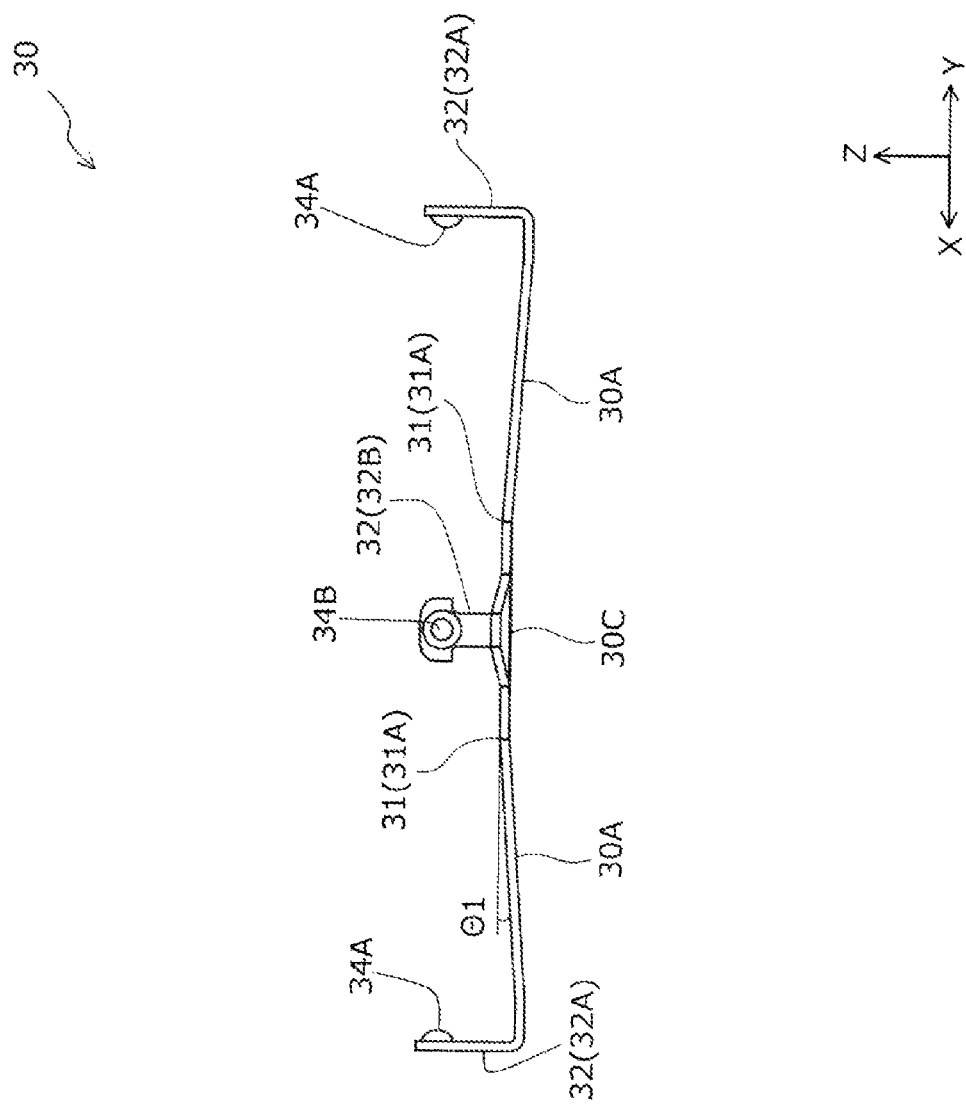
FIG. 9 is a diagram illustrating the gimbal mechanism of the optical unit in FIG. 1, as viewed from the direction A in FIG. 3.
Figure 10:
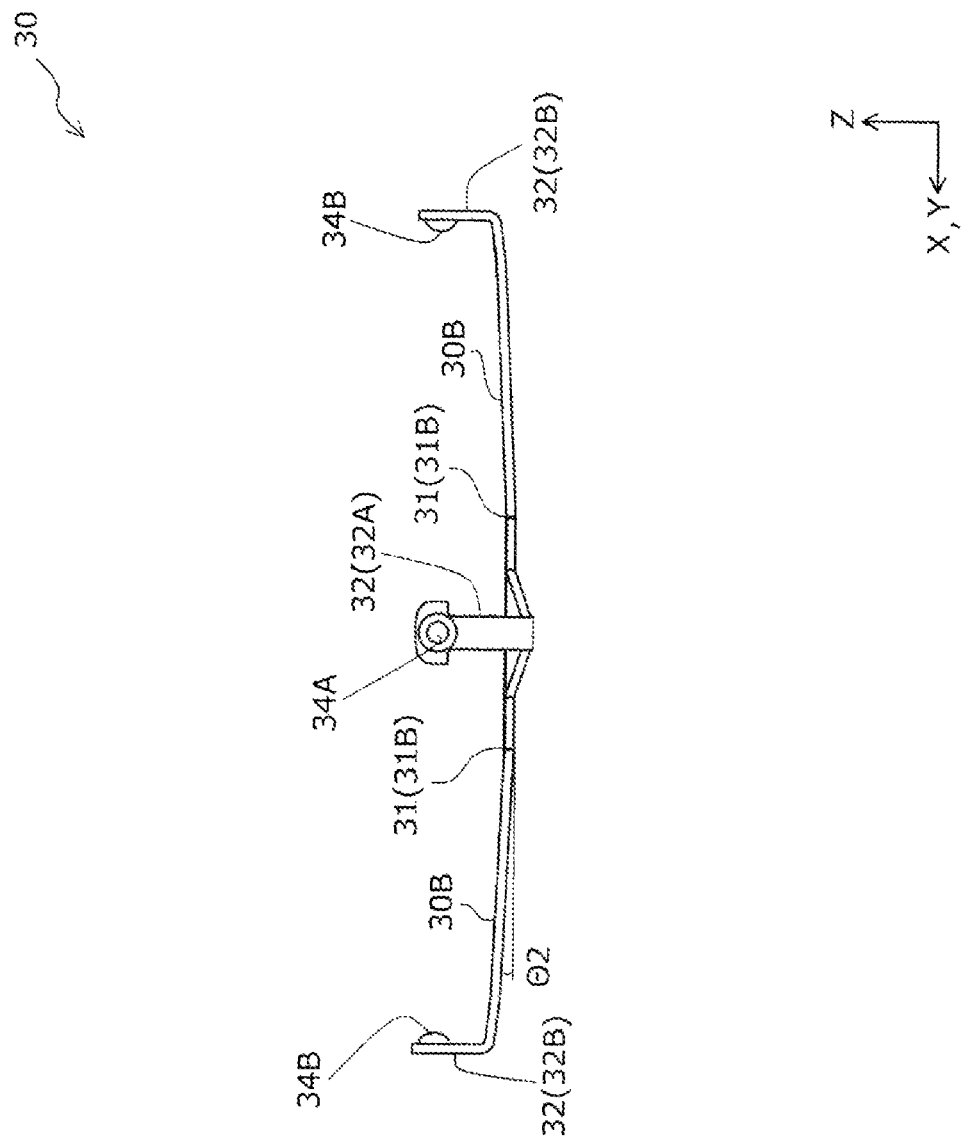
FIG. 10 is a diagram illustrating the gimbal mechanism of the optical unit in FIG. 1, as viewed from the direction B in FIG. 3.

As shown in FIGS. 9 and 10, in the gimbal mechanism 30 of the present embodiment, the fixed body-side arm portions 30A and the movable body-side arm portions 30B are inclined with respect to the flat plate portion 30C from the base end portions 31 toward the tip end portions 32 as viewed from the intersecting directions. An inclination direction of the fixed body-side arm portions 30A (the fixed body-side arm portions 30A are inclined to be located farther in the −Z direction from the base end portions 31 toward the tip end portions 32) and an inclination direction of the movable body-side arm portions 30B (the movable body-side arm portions 30B are inclined to be located farther in the +Z direction from the base end portions 31 toward the tip end portions 32) are opposite to each other as viewed from the intersecting directions. Such a configuration enables a swing range of the movable body 20 with respect to the fixed body 10 in the optical axis direction to be efficiently arranged on the subject side (+Z direction side) and on the opposite subject side (−Z direction side), allowing the movable body 20 to effectively swing with respect to the fixed body 10 even when a gap G (see FIGS. 6 and 7) between the gimbal mechanism 30 and each of the movable body 20 and the fixed body 10 is small. This enables the optical unit 1 in which the movable body 20 including the optical module 22 is swingably supported with respect to the fixed body 10 to have a small thickness in the optical axis direction, without causing the optical unit 1 to have a small swing range.

In the optical unit 1 of the present embodiment, the shape of the gimbal mechanism 30 is adjusted in such a manner that the fixed body 10 has, on the opposite subject side, a bottom surface (bottom surface component 10B) that faces the flat plate portion 30C and a gap G1 between the flat plate portion 30C and the movable body 20 and a gap G2 between the flat plate portion 30C and the bottom surface as viewed from the intersecting directions are substantially equivalent, and specifically, a difference between the gap G1 and the gap G2 is 0.2 mm or less. Such a configuration enables the swing range of the movable body 20 with respect to the fixed body 10 in the optical axis direction to be substantially uniformly arranged on the subject side and on the opposite subject side, effectively allowing the optical unit 1 to have a large swing range of the movable body 20 with respect to the fixed body 10 even when the gap G between the gimbal mechanism 30 and each of the movable body 20 and the fixed body 10 is small.

In the optical unit 1 of the present embodiment, an inclination angle Θ1 (see FIG. 9) of the fixed body-side arm portions 30A with respect to the flat plate portion 30C and an inclination angle Θ2 (see FIG. 10) of the movable body-side arm portions 30B with respect to the flat plate portion 30C as viewed from the intersecting directions are both adjusted to be less than 5°. The inclination angle Θ1 and the inclination angle Θ2 are preferably substantially equivalent, and specifically, a difference between the inclination angle Θ1 and the inclination angle Θ2 is preferably 2° or less. This is because such a configuration enables the swing range of the movable body 20 with respect to the fixed body 10 in the optical axis direction to be substantially uniformly arranged on the subject side and on the opposite subject side, effectively allowing the optical unit 1 to have a large swing range of the movable body 20 with respect to the fixed body 10 even when the gap G between the gimbal mechanism 30 and each of the movable body 20 and the fixed body 10 is small.

In the optical unit 1 of the present embodiment, a length L1 (see FIG. 8) of the fixed body-side arm portions 30A and a length L2 (see FIG. 8) of the movable body-side arm portions 30B as viewed from the optical axis direction are substantially equivalent, and specifically, a difference between the length L1 and the length L2 is 2 mm or less. Such a configuration enables the movable body 20 to swing with respect to the fixed body 10 with a smaller amount of displacement with respect to the optical axis direction, effectively allowing the optical unit 1 to have a large swing range of the movable body 20 with respect to the fixed body 10 even when the gap G between the gimbal mechanism 30 and each of the movable body 20 and the fixed body 10 is small.

In the optical unit 1 of the present embodiment, a spring constant of the fixed body-side arm portions 30A and a spring constant of the movable body-side arm portions 30B are substantially equivalent. Such a configuration enables the movable body 20 to swing with respect to the fixed body 10 with a smaller amount of displacement with respect to the optical axis direction, effectively allowing the optical unit 1 to have a large swing range of the movable body 20 with respect to the fixed body 10 even when the gap G between the gimbal mechanism 30 and each of the movable body 20 and the fixed body 10 is small.

Figure 6:
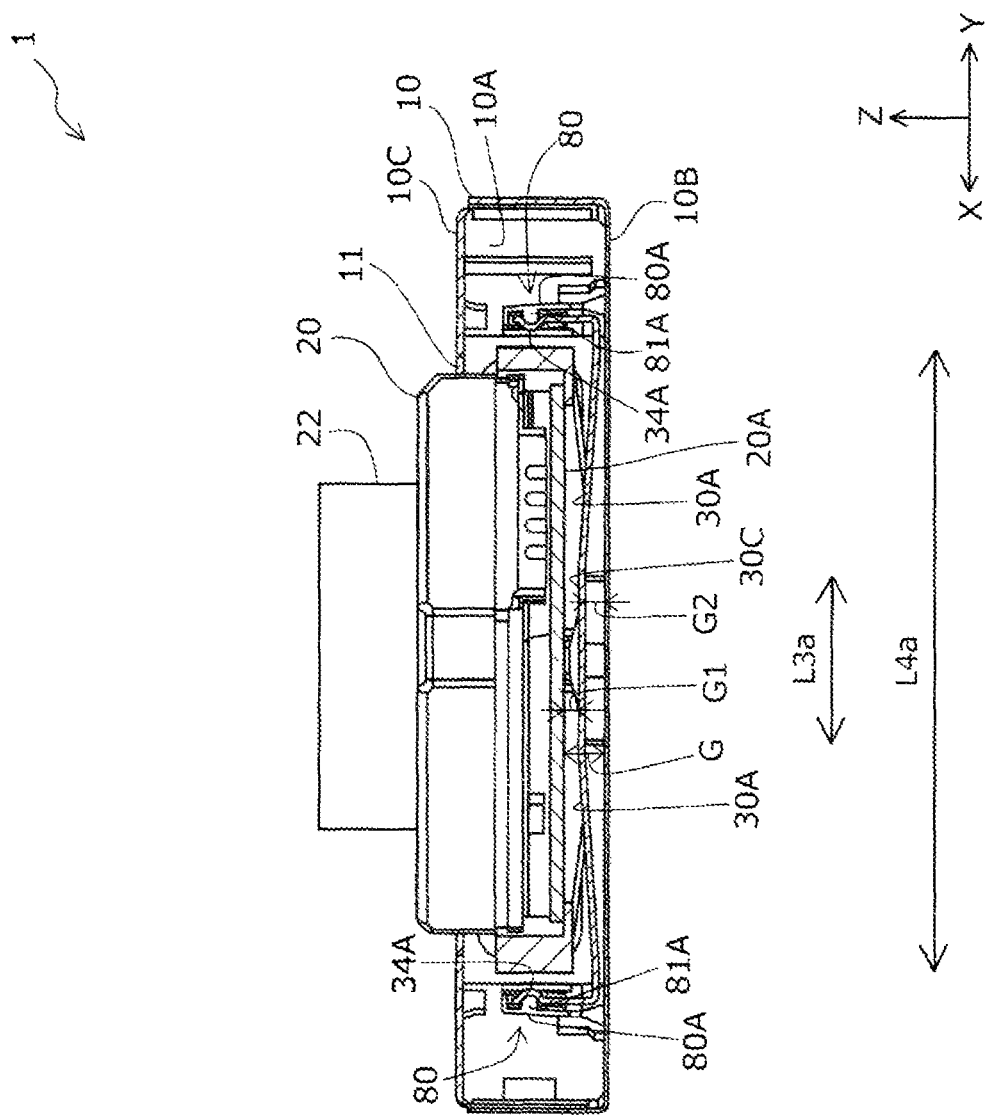
FIG. 6 is a cross-sectional view of the optical unit in FIG. 1, as viewed from a direction A in FIG. 3.
Figure 7:
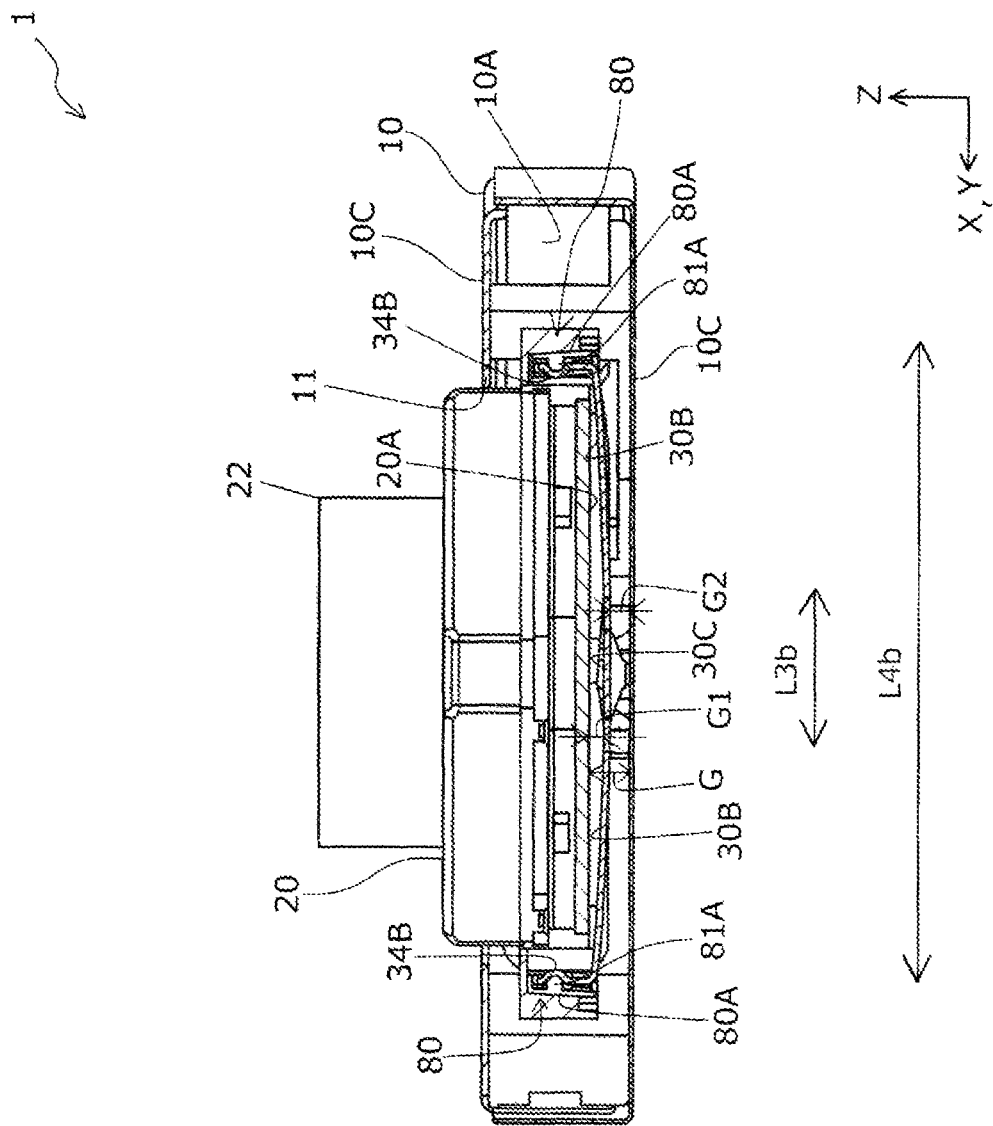
FIG. 7 is a cross-sectional view of the optical unit in FIG. 1, as viewed from a direction B in FIG. 3.

In the optical unit 1 of the present embodiment, as shown in FIG. 6, a length L3a of the flat plate portion 30C in the first intersecting direction C1 is equal to or less than half a length L4a of the movable body 20 in the first intersecting direction C1. Furthermore, as shown in FIG. 7, a length L3b of the flat plate portion 30C in the second intersecting direction C2 is equal to or less than half a length L4b of the movable body 20 in the second intersecting direction C2. Thus, the optical unit 1 of the present embodiment is preferably configured such that at least the length L3a of the flat plate portion 30C in the first intersecting direction C1 is equal to or less than half the length L4a of the movable body 20 in the first intersecting direction C1 or the length L3b of the flat plate portion 30C in the second intersecting direction C2 is equal to or less than half the length L4b of the movable body 20 in the second intersecting direction C2.

Figure 11:
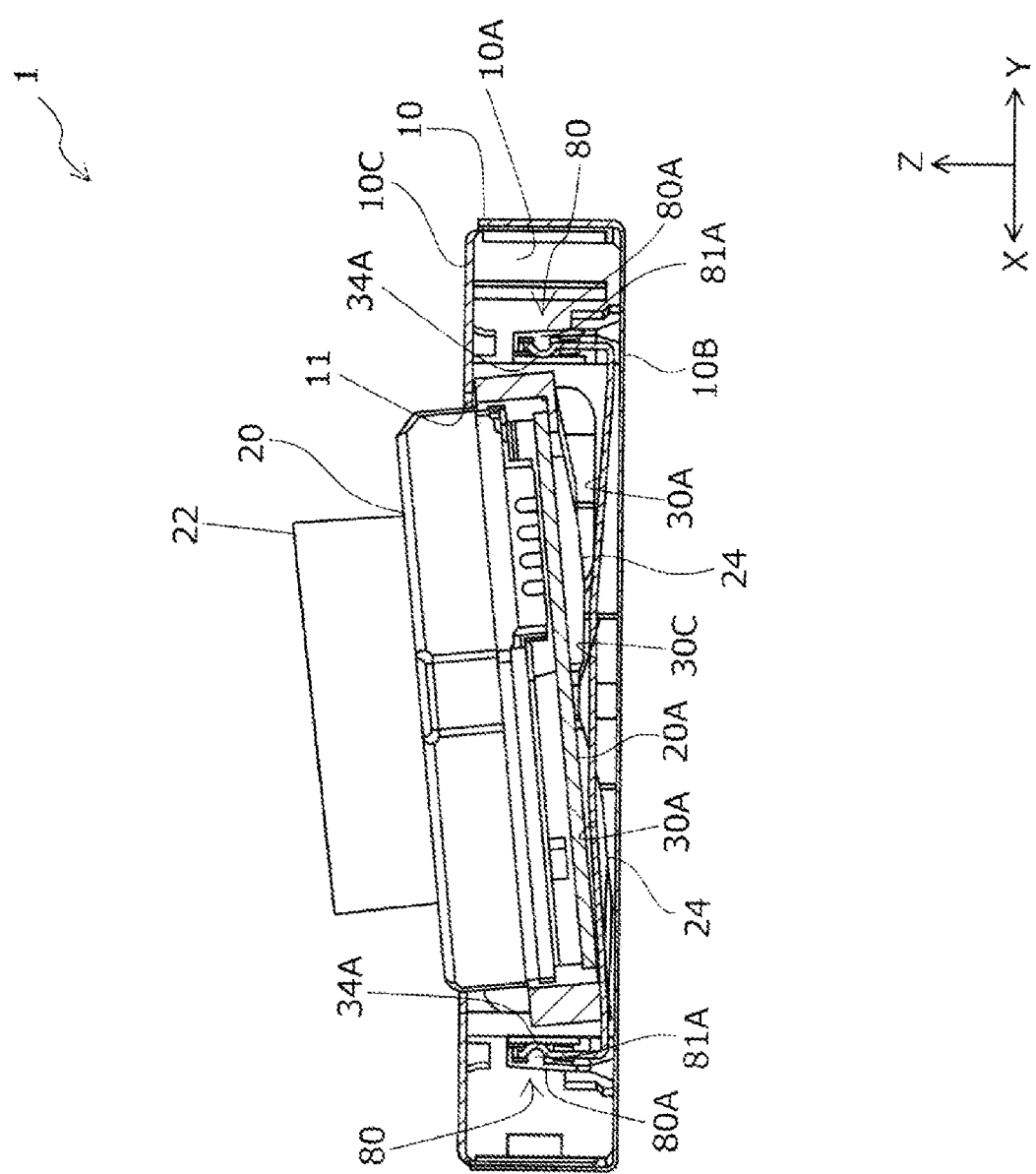
FIG. 11 is a cross-sectional view of the optical unit in FIG. 1, as viewed from the direction A in FIG. 3, and illustrates a state in which a movable body is inclined to the maximum extent with respect to the fixed body around a rotation axis that extends along movable body-side arm portions.
Figure 12:
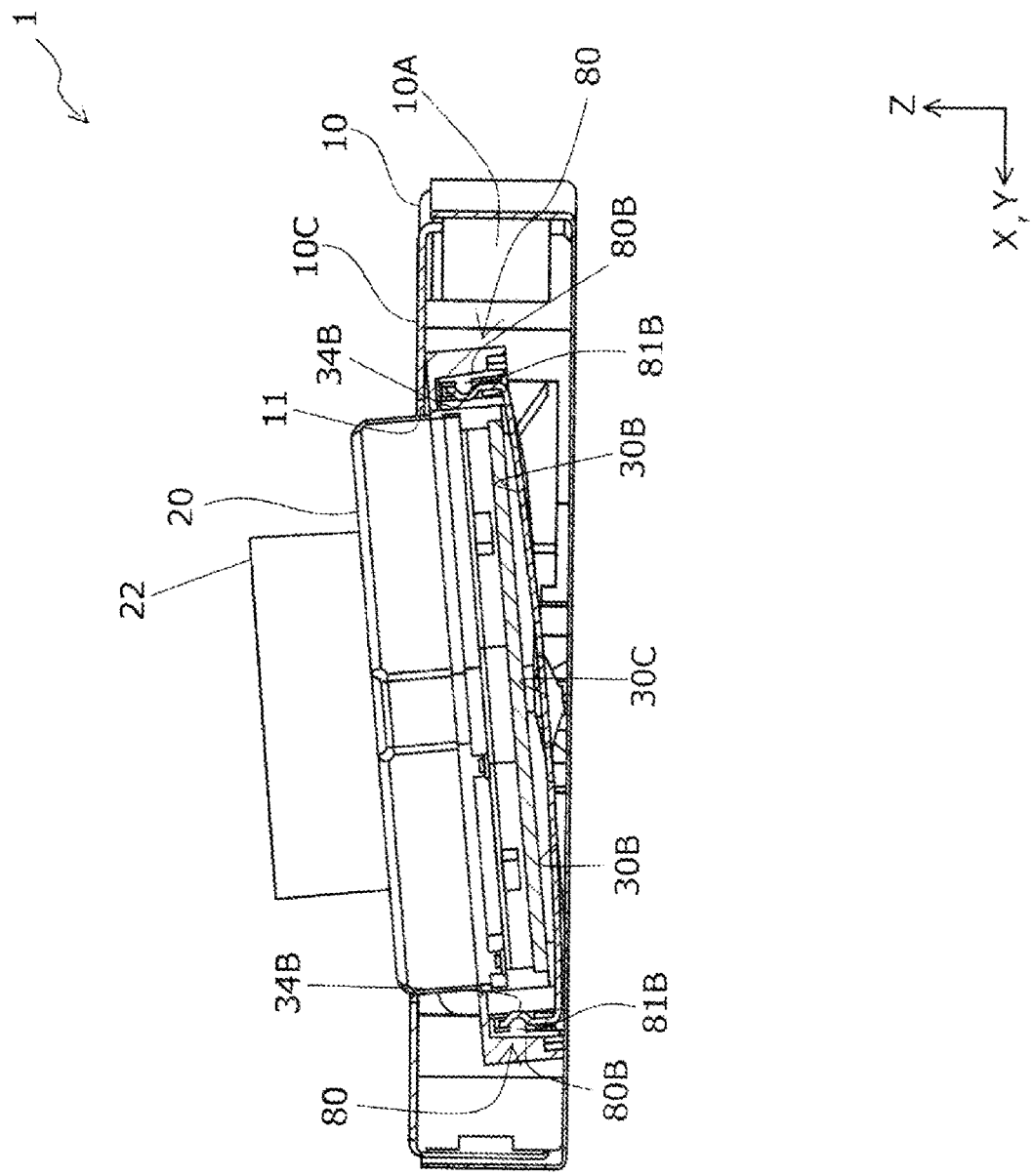
FIG. 12 is a cross-sectional view of the optical unit in FIG. 1, as viewed from the direction B in FIG. 3, and illustrates a state in which the movable body is inclined to the maximum extent with respect to the fixed body around a rotation axis that extends along fixed body-side arm portions.

Such a configuration can effectively prevent the movable body 20 from colliding with the flat plate portion 30C even when the gimbal mechanism 30 swings to the maximum extent around a rotation axis that extends along the movable body-side arm portions 30B as shown in FIG. 11 or around a rotation axis that extends along the fixed body-side arm portions 30A as shown in FIG. 12. In other words, the configuration can prevent a collision between the flat plate portion 30C and the movable body 20 and a collision between the flat plate portion 30C and the bottom surface component 10B while the movable body 20 is swinging, and can eliminate the necessity for the optical unit 1 to have a large gap G1 and a large gap G2, thus eliminating the necessity for the optical unit 1 to have a large size in the optical axis direction.

As shown in FIG. 8, in the optical unit 1 of the present embodiment, a width of the fixed body-side arm portions 30A and the movable body-side arm portions 30B is gradually reduced from the base end portions 31 toward the tip end portions 32. In other words, the fixed body-side arm portions 30A and the movable body-side arm portions 30B both do not have a constricted portion or an expanded portion. Such a configuration can achieve less stress concentration in the fixed body-side arm portions 30A and the movable body-side arm portions 30B.

In the optical unit 1 of the present embodiment, the fixed body 10 has, on the opposite subject side, the bottom surface component 10B that is the bottom surface facing the flat plate portion 30C, the movable body 20 has a facing surface 20A that faces the bottom surface component 10B, the facing surface 20A has protruding portions 24 (see FIG. 5) that protrude toward the bottom surface component 10B, and when the movable body 20 is displaced with respect to the fixed body 10 toward the opposite subject side, the protruding portions 24 are brought into contact with the bottom surface component 10B before the gimbal mechanism 30 is brought into contact with the bottom surface component 10B. Such a configuration can prevent the gimbal mechanism 30 whose structure makes it difficult to achieve higher impact resistance from colliding with the bottom surface component 10B, for example, when an external force or the like is applied to the optical unit 1 and the movable body 20 is moved with respect to the fixed body 10 in the optical axis direction.

From another viewpoint, in the optical unit 1 of the present embodiment, even when the movable body 20 is displaced with respect to the fixed body 10 toward the opposite subject side and the protruding portions 24 are brought into contact with the bottom surface component 10B, the gap G1 at the position at which the flat plate portion 30C and the movable body 20 face each other and the gap G2 between the gimbal mechanism 30 and the fixed body 10 do not become zero. Such a configuration can prevent the gimbal mechanism 30 whose structure makes it difficult to achieve higher impact resistance from colliding with the bottom surface component 10B.

In the optical unit 1 of the present embodiment, even when the gimbal mechanism 30 swings to the maximum extent around a rotation axis that extends along the movable body-side arm portions 30B as shown in FIG. 11 or around a rotation axis that extends along the fixed body-side arm portions 30A as shown in FIG. 12, the protruding portions 24 are brought into contact with the bottom surface component 10B before the gimbal mechanism 30 is brought into contact with the bottom surface component 10B. Such a configuration can prevent the gimbal mechanism 30 whose structure makes it difficult to achieve higher impact resistance from colliding with the bottom surface component 10B.

In the optical unit 1 of the present embodiment, the flat plate portion 30C is less likely to be deformed than the fixed body-side arm portions 30A and the movable body-side arm portions 30B. Such a configuration can prevent the flat plate portion 30C from being distorted and interfering with sequential distortion of the fixed body-side arm portions 30A and the movable body-side arm portions 30B, that is, prevent the flat plate portion 30C from being distorted and causing the optical unit to have a small swing range of the movable body 20 with respect to the fixed body 10.

As shown in FIGS. 5, 8, and the like, in the optical unit 1 of the present embodiment, the flat plate portion 30C has hole portions 33 at positions closer to the base end portions 31 of the fixed body-side arm portions 30A or the movable body-side arm portions 30B, whichever have a higher spring constant, than to the base end portions 31 of the fixed body-side arm portions 30A or the movable body-side arm portions 30B, whichever have a lower spring constant. Such a configuration achieves, with high accuracy, a uniform spring constant in the direction (first intersecting direction C1) in which the fixed body-side arm portions 30A extend and in the direction (second intersecting direction C2) in which the movable body-side arm portions 30B extend. The uniform spring constant in the first intersecting direction C1 and in the second intersecting direction C2 effectively enables the movable body 20 to swing with respect to the fixed body 10 with a smaller amount of displacement with respect to the optical axis direction, effectively allowing the optical unit 1 to have a large swing range of the movable body 20 with respect to the fixed body 10 even when the gap G between the gimbal mechanism 30 and each of the movable body 20 and the fixed body 10 is small.

Rotation Drive Mechanism

Next, the rotation drive mechanism will be described. As described above, the magnets 21A and 21B have the same configuration, and the coil 61A at the position facing the magnet 21A and the coil 61B at the position facing the magnet 21B have the same configuration. As shown in FIGS. 1 to 4, the optical unit 1 of the present embodiment includes, as the rotation drive mechanism, a pitch axis swing mechanism composed of the magnet 21A and the coil 61A and a yaw axis swing mechanism composed of the magnet 21B and the coil 61B. However, the optical unit 1 of the present embodiment is not limited to such a configuration, and may include only one of the pitch axis swing mechanism and the yaw axis swing mechanism. Furthermore, the optical unit 1 of the present embodiment may include a roll axis swing mechanism that allows the movable body 20 to be swingable with respect to the fixed body 10 in the rolling direction.

Connecting Portion

As shown in FIGS. 6, 7, and the like, the optical unit 1 of the present embodiment includes connecting portions 80 that swingably connect the gimbal mechanism 30 to the fixed body 10 and the movable body 20. Specifically, the optical unit 1 of the present embodiment includes, as the connecting portions 80, fixed body connecting portions 80A that include protruding portions 81A that protrude inward as viewed from the optical axis direction as shown in FIG. 6, and movable body connecting portions 80B that include protruding portions 81B that protrude inward as viewed from the optical axis direction as shown in FIG. 7. The fixed body-side arm portions 30A of the gimbal mechanism 30 are attached to the fixed body connecting portions 80A, and the fixed body connecting portions 80A are located at two opposite corners of four corners of the case portion 10A having a rectangular frame shape of the fixed body 10. Furthermore, the movable body-side arm portions 30B of the gimbal mechanism 30 are attached to the movable body connecting portions 80B, and the movable body connecting portions 80B are located at two opposite corners of four corners of the movable body 20 having a rectangular frame shape.

The fixed body-side arm portions 30A have recesses 34A that house the protruding portions 81A, and the movable body-side arm portions 30B have recesses 34B that house the protruding portions 81B. The case portion 10A and the movable body 20 are arranged in such a manner that the four corners are aligned, and the two fixed body connecting portions 80A and the two movable body connecting portions 80B are located at the respective four corners. The connecting portions 80 having such a configuration support the gimbal mechanism 30 with respect to the fixed body 10 and the movable body 20. In the connecting portions 80 of the present embodiment, the protruding portions 81A are composed of protruding portions of the fixed body connecting portions 80A, and the protruding portions 81B are composed of protruding portions of the movable body connecting portions 80B. However, the connecting portions 80 of the present embodiment are not limited to such a configuration, and the protruding portions 81A and 81B may be composed of, for example, spherical members attached to the fixed body connecting portions 80A and the movable body connecting portions 80B, respectively, by welding or the like.

The present invention is not limited to the above-described embodiments, and can be implemented with various configurations without departing from the spirit of the present invention. For example, the technical features in the embodiments corresponding to the technical features in each of the aspects described in SUMMARY may be appropriately replaced or combined to solve some or all of the problems described above, or to achieve some or all of the effects described above. Furthermore, any of the technical features that is not described as essential in the present specification may be omitted as appropriate.

Finally, at least an embodiment of the present invention will be comprehensively described below.

(1)

An optical unit including: a movable body including an optical module; a fixed body; and a gimbal mechanism that rotatably supports the movable body with respect to the fixed body around a rotation axis that extends in at least one of intersecting directions intersecting an optical axis direction along an optical axis of the optical module, wherein the gimbal mechanism includes a flat plate portion that is provided on an opposite subject side opposite to a subject side of the optical module with respect to the movable body in the optical axis direction, two fixed body-side arm portions that extend from base end portions connected to the flat plate portion to tip end portions connected to the fixed body in a first intersecting direction of the intersecting directions, and two movable body-side arm portions that extend from base end portions connected to the flat plate portion to tip end portions connected to the movable body in a second intersecting direction of the intersecting directions, the fixed body-side arm portions and the movable body-side arm portions are inclined with respect to the flat plate portion as viewed from the intersecting directions, and an inclination direction of the fixed body-side arm portions and an inclination direction of the movable body-side arm portions are opposite to each other as viewed from the intersecting directions.

(2)

The optical unit according to (1), wherein the fixed body has, on the opposite subject side, a bottom surface that faces the flat plate portion, and a difference between a gap between the flat plate portion and the movable body and a gap between the flat plate portion and the bottom surface as viewed from the intersecting directions is 0.2 mm or less.

(3)

The optical unit according to (1) or (2), wherein a difference between an inclination angle of the fixed body-side arm portions with respect to the flat plate portion and an inclination angle of the movable body-side arm portions with respect to the flat plate portion as viewed from the intersecting directions is 2° or less.

(4)

The optical unit according to any one of (1) to (3), wherein a difference between a length of the fixed body-side arm portions and a length of the movable body-side arm portions as viewed from the optical axis direction is 2 mm or less.

(5)

The optical unit according to any one of (1) to (4), wherein at least one of: a length of the flat plate portion in the first intersecting direction being equal to or less than half a length of the movable body in the first intersecting direction; and a length of the flat plate portion in the second intersecting direction being equal to or less than half a length of the movable body in the second intersecting direction, holds true.

(6)

The optical unit according to any one of (1) to (5), wherein a width of the fixed body-side arm portions and the movable body-side arm portions is gradually reduced from the base end portions toward the tip end portions.

(7)

The optical unit according to any one of (1) to (6), wherein the fixed body has, on the opposite subject side, a bottom surface that faces the flat plate portion, the movable body has a facing surface that faces the bottom surface, the facing surface has a protruding portion that protrudes toward the bottom surface, and when the movable body is displaced with respect to the fixed body toward the opposite subject side, the protruding portion is brought into contact with the bottom surface before the gimbal mechanism is brought into contact with the bottom surface.

(8)

The optical unit according to any one of (1) to (7), wherein the flat plate portion is less likely to be deformed than the fixed body-side arm portions and the movable body-side arm portions.

(9)

The optical unit according to (8), wherein the flat plate portion has hole portions at positions closer to the base end portions of the fixed body-side arm portions or the movable body-side arm portions, whichever have a higher spring constant, than to the base end portions of the fixed body-side arm portions or the movable body-side arm portions, whichever have a lower spring constant.

What is claimed is:

1. An optical unit comprising:
a movable body comprising an optical module;
a fixed body; and
a gimbal mechanism that rotatably supports the movable body with respect to the fixed body around a rotation axis that extends in at least one of intersecting directions intersecting an optical axis direction along an optical axis of the optical module, wherein
the gimbal mechanism comprises
a flat plate portion that is provided on an opposite subject side opposite to a subject side of the optical module with respect to the movable body in the optical axis direction, two fixed body-side arm portions that extend from base end portions connected to the flat plate portion to tip end portions connected to the fixed body in a first intersecting direction of the intersecting directions, and two movable body-side arm portions that extend from base end portions connected to the flat plate portion to tip end portions connected to the movable body in a second intersecting direction of the intersecting directions, the fixed body-side arm portions and the movable body-side arm portions are inclined with respect to the flat plate portion as viewed from the intersecting directions, and an inclination direction of the fixed body-side arm portions and an inclination direction of the movable body-side arm portions are opposite to each other as viewed from the intersecting directions.

2. The optical unit according to claim 1, wherein
the fixed body has, on the opposite subject side, a bottom surface that faces the flat plate portion, and
a difference between a gap between the flat plate portion and the movable body and a gap between the flat plate portion and the bottom surface as viewed from the intersecting directions is 0.2 mm or less.

3. The optical unit according to claim 2, wherein
a difference between an inclination angle of the fixed body-side arm portions with respect to the flat plate portion and an inclination angle of the movable body-side arm portions with respect to the flat plate portion as viewed from the intersecting directions is 2° or less.

4. The optical unit according to claim 2, wherein
a difference between a length of the fixed body-side arm portions and a length of the movable body-side arm portions as viewed from the optical axis direction is 2 mm or less.

5. The optical unit according to claim 2, wherein
at least one of: a length of the flat plate portion in the first intersecting direction being equal to or less than half a length of the movable body in the first intersecting direction; and a length of the flat plate portion in the second intersecting direction being equal to or less than half a length of the movable body in the second intersecting direction, holds true.

6. The optical unit according to claim 2, wherein
a width of the fixed body-side arm portions and the movable body-side arm portions is gradually reduced from the base end portions toward the tip end portions.

7. The optical unit according to claim 2, wherein
the flat plate portion is less likely to be deformed than the fixed body-side arm portions and the movable body-side arm portions.

8. The optical unit according to claim 7, wherein
the flat plate portion has hole portions at positions closer to the base end portions of the fixed body-side arm portions or the movable body-side arm portions, whichever have a higher spring constant, than to the base end portions of the fixed body-side arm portions or the movable body-side arm portions, whichever have a lower spring constant.

9. The optical unit according to claim 1, wherein
the fixed body has, on the opposite subject side, a bottom surface that faces the flat plate portion,
the movable body has a facing surface that faces the bottom surface,
the facing surface has a protruding portion that protrudes toward the bottom surface, and
when the movable body is displaced with respect to the fixed body toward the opposite subject side, the protruding portion is brought into contact with the bottom surface before the gimbal mechanism is brought into contact with the bottom surface.

10. The optical unit according to claim 1, wherein
the flat plate portion is less likely to be deformed than the fixed body-side arm portions and the movable body-side arm portions.

11. The optical unit according to claim 8, wherein
the flat plate portion has hole portions at positions closer to the base end portions of the fixed body-side arm portions or the movable body-side arm portions, whichever have a higher spring constant, than to the base end portions of the fixed body-side arm portions or the movable body-side arm portions, whichever have a lower spring constant.

12. The optical unit according to claim 1, wherein
a difference between an inclination angle of the fixed body-side arm portions with respect to the flat plate portion and an inclination angle of the movable body-side arm portions with respect to the flat plate portion as viewed from the intersecting directions is 2° or less.

13. The optical unit according to claim 1, wherein
a difference between a length of the fixed body-side arm portions and a length of the movable body-side arm portions as viewed from the optical axis direction is 2 mm or less.

14. The optical unit according to claim 1, wherein
at least one of: a length of the flat plate portion in the first intersecting direction being equal to or less than half a length of the movable body in the first intersecting direction; and a length of the flat plate portion in the second intersecting direction being equal to or less than half a length of the movable body in the second intersecting direction, holds true.

15. The optical unit according to claim 1, wherein
a width of the fixed body-side arm portions and the movable body-side arm portions is gradually reduced from the base end portions toward the tip end portions.

* * * * *